United States Patent
Rogers

(10) Patent No.: US 6,321,525 B1
(45) Date of Patent: Nov. 27, 2001

(54) OVERSPEED DETECTION TECHNIQUES FOR GAS TURBINE ENGINE

(75) Inventor: David Mark Rogers, Greenwood, IN (US)

(73) Assignee: Rolls-Royce Corporation, Indianapolis, IN (US)

(*) Notice: Subject to any disclaimer, the term of this patent is extended or adjusted under 35 U.S.C. 154(b) by 0 days.

(21) Appl. No.: 09/497,558

(22) Filed: Feb. 3, 2000

(51) Int. Cl.$^7$ .................................................. F02C 9/28
(52) U.S. Cl. ........................................ 60/39.03; 60/39.281
(58) Field of Search ........................... 60/39.03, 39.091, 60/39.281

(56) References Cited

U.S. PATENT DOCUMENTS

| | | | |
|---|---|---|---|
| 3,928,962 | * 12/1975 | Maker | 60/39.281 |
| 3,932,058 | 1/1976 | Harner et al. | 416/28 |
| 3,939,649 | 2/1976 | McCabe | 60/39.28 |
| 3,956,884 | 5/1976 | Eves | 60/39.28 |
| 4,045,955 | * 9/1977 | Brannstrom et al. | 60/39.281 |
| 4,218,879 | 8/1980 | Hagman et al. | 60/39.28 |
| 4,248,040 | 2/1981 | Kast | 60/39.27 |
| 4,302,931 | 12/1981 | White et al. | 60/39.28 |
| 4,423,593 | 1/1984 | Zagranski et al. | 60/39.161 |
| 4,474,013 | 10/1984 | Chamberlain | 60/660 |
| 4,478,038 | 10/1984 | Cropper et al. | 60/39.02 |
| 4,528,812 | 7/1985 | Cantwell | 60/39.281 |
| 4,578,945 | 4/1986 | Peck et al. | 60/39.281 |
| 4,593,523 | 6/1986 | Hawes | 60/39.281 |
| 4,845,943 | 7/1989 | LaPrad et al. | 60/39.03 |
| 4,987,737 | 1/1991 | Cantwell | 60/39.281 |
| 4,998,949 | 3/1991 | Cantwell | 60/39.161 |
| 5,134,845 | 8/1992 | Romano | 60/39.281 |
| 5,301,499 | 4/1994 | Kure-Jensen et al. | 60/39.03 |
| 5,440,490 | 8/1995 | Summerfield | 364/431.02 |
| 5,486,997 | 1/1996 | Reismiller et al. | 364/165 |
| 5,579,632 | 12/1996 | Dutka et al. | 60/39.281 |
| 5,927,064 | 7/1999 | Dyer et al. | 60/39.141 |
| 5,953,902 | * 9/1999 | Jerye et al. | 60/39.281 |

* cited by examiner

Primary Examiner—Louis J. Casaregola
(74) Attorney, Agent, or Firm—Woodard, Emhardt, Naughton, Moriarty & McNett

(57) ABSTRACT

Unique systems and methods are disclosed to detect and remediate an overspeed condition of a gas turbine engine. Such techniques include sensing rotational speed of a rotating member of a gas turbine engine and providing a first speed threshold that varies with rotational acceleration of this member over a predefined range. An overspeed condition of the gas turbine engine is detected if the rotational speed exceeds this first speed threshold and a second speed threshold. This second speed threshold is greater than or equal to the first speed threshold when the overspeed condition is detected. In response to the overspeed detection, a fuel valve may be actuated to adjust fuel flow to the engine. In one embodiment, an analog circuit compares the first and second speed thresholds to the rotational speed and controls current flow through an actuator for an overspeed fuel valve associated with the engine.

21 Claims, 2 Drawing Sheets

OVERSPEED DETECTION TECHNIQUES FOR GAS TURBINE ENGINE

BACKGROUND

The present invention relates to engine control techniques, and more particularly, but not exclusively, relates to gas turbine engine overspeed detection and remediation.

A sudden loss of load for a gas turbine engine can result in a highly destructive failure if not quickly addressed. This type of load loss can occur, for example, when an engine shaft or associated gearing fails. One way to detect if a load loss has occurred is to monitor for an engine overspeed event. One basic type of overspeed detection compares rotational engine speed to a static limit. When this limit is exceeded, an overspeed condition is declared and engine fueling is consequently reduced or shut off. Unfortunately, when the static limit is set too low, false triggering can occur because of brief transient excursions beyond the overspeed limit. Such false triggering typically results in an unwarranted loss of engine power. On the other hand, when the static limit is set to high, the destructive effects of catastrophic, load loss failures are likely to progress further before the overspeed situation is addressed.

One alternative to address these shortcomings is to vary the overspeed limit with a different parameter more closely associated with catastrophic failure load loss, such as rotational acceleration. However, acceleration-based systems are often very sensitive to noise such as might be caused by power transients, electromagnetic interference, lightning, and the like—once again resulting in false triggers and unwarranted engine power loss. Thus, there is a demand for further contributions in this area of technology.

SUMMARY

One form of the present invention is a unique overspeed a monitoring technique. Other forms include unique systems and methods to detect an unacceptable gas turbine engine overspeed condition.

In another form, rotational speed of a rotating member of a gas turbine engine is determined and an overspeed condition of the gas turbine engine established if the rotational speed exceeds a first speed threshold and a second speed threshold. The first speed threshold varies relative to the second speed threshold in accordance with the rate of change of the rotational speed.

Still another form includes a gas turbine engine with a rotatable member and a sensor to provide a signal corresponding to rotational speed of this member. A control is also included that responds to this signal to detect an overspeed condition of the gas turbine engine if the rotational speed exceeds first and second speed thresholds. The control is operable to determine the first speed threshold as a function of rotational acceleration of the rotatable member. The first speed threshold varies relative to the second speed threshold in accordance with this acceleration. Further, an actuator may be included that responds to the control to reduce the rotational speed when the overspeed condition is detected. Such reduction can include activating a fuel valve to reduce or eliminate the flow of fuel to the engine; however, other actions as would occur to those skilled in the art may alternatively or additionally be performed.

Further forms, embodiments, objects, features, aspects, benefits, and advantages of the present invention shall become apparent from the detailed description and drawings contained herein.

DETAILED DESCRIPTION OF SELECTED EMBODIMENTS

Figure 1:
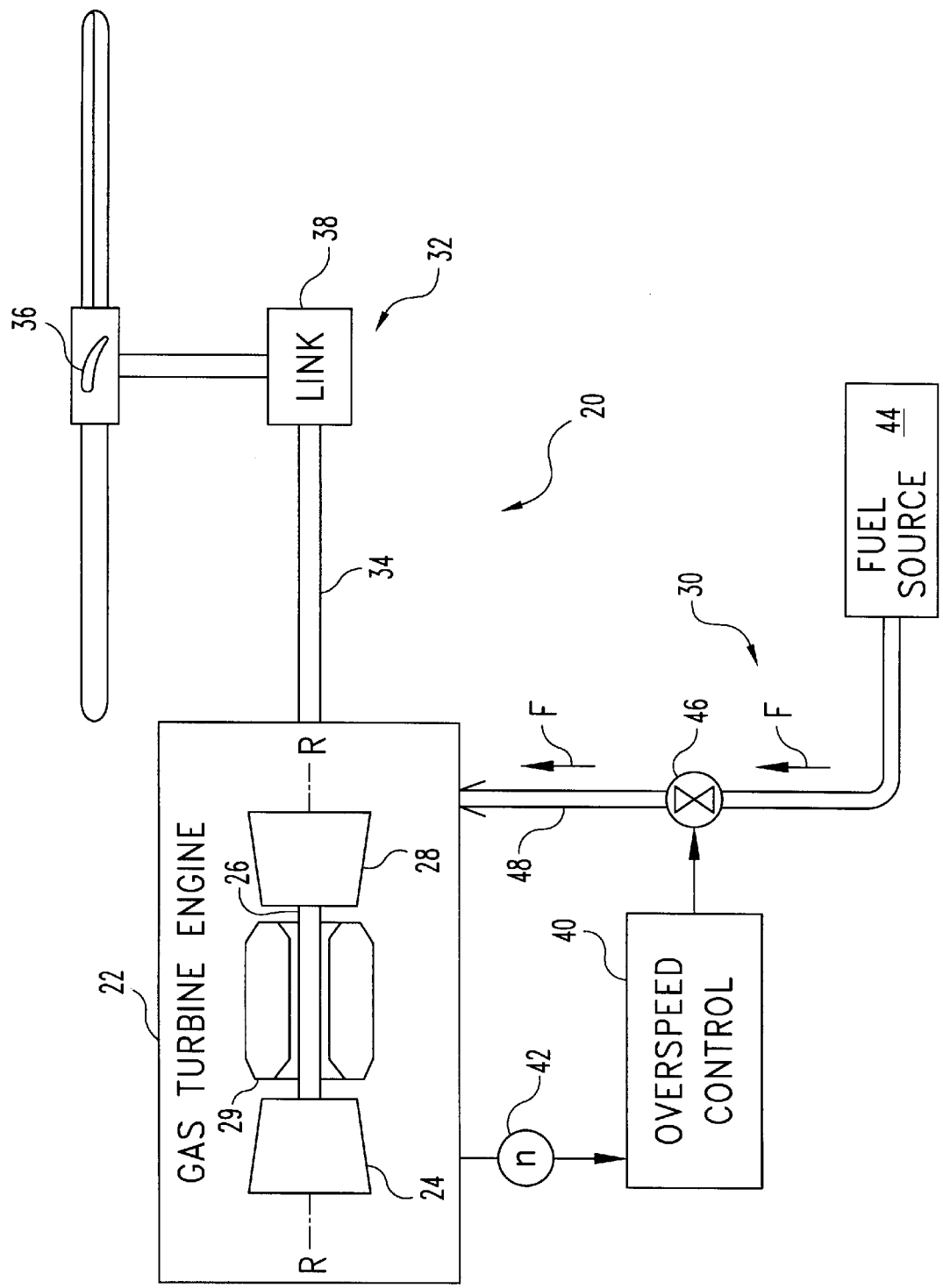
FIG. 1 is a schematic view of a system of one embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

FIG. 1 depicts system 20 of one embodiment of the present invention. System 20 includes gas turbine engine 22 with selected components schematically represented in FIG. 1. These components include compressor 24, rotatable shaft 26, turbine 28, and combustor 29. Shaft 26 is mechanically coupled to compressor 24 and turbine 28 to collectively turn about rotational axis R—R. Combustor 29 is positioned between compressor 24 and turbine 28 along axis R—R. Combustor 29 selectively receives fuel from fuel subsystem 30 of system 20.

Gas turbine engine 22 is configured with an intake (not shown) to deliver air to compressor 24. Compressor 24 pressurizes the air as it rotates with shaft 26. At least a portion of this pressurized air is provided from compressor 24 to combustor 29 for mixing with fuel from fuel subsystem 30. The resulting fuel/air mixture is ignited, producing hot, expanding exhaust gases that cause turbine 28 to rotate before being discharged through an outlet (not shown) of gas turbine engine 22. As turbine 28 rotates, shaft 26 turns, causing compressor 24 to rotate; thereby continuing to supply pressurized air for sustained combustion.

It should be understood that gas turbine engine 22 may include a number of other components that are not shown to enhance clarity. Further, compressor 24 and/or turbine 28 may be of a single or multi-stage variety. Alternatively or additionally, gas turbine engine 22 may include multiple spools each comprised of a compressor rotatably coupled by a shaft to a turbine. In one common "dual spool" configuration, the shafts of two spools are arranged concentric to one another to correspondingly provide a low pressure or fan stage compressor upstream of a high pressure compressor, with a corresponding pair of turbines to drive the low and high pressure stages. In another configuration, gas turbine engine 22 also includes a turbine that is not coupled to a compressor and correspondingly is capable of rotating freely relative to any compressor. Instead, this free turbine is typically arranged to turn a shaft for delivering mechanical power.

In FIG. 1, gas turbine engine load 32 is shown coupled to gas turbine engine 22 by power shaft 34. In turn, shaft 34 is coupled to propulsion rotor 36 by a mechanical linkage 38. As depicted, load 32 is representative of a helicopter or turboprop propulsion arrangement that is often powered by a gas turbine engine of the free turbine variety. However, in other embodiments, a different propulsion arrangement may be utilized with gas turbine engine 22. By way of nonlimiting example, gas turbine engine 22 may be configured to provide thrust by the discharge of working fluid through a nozzle of engine 22 (not shown), which serves as the primary source of propulsion.

System 20 also includes overspeed control 40. Overspeed control 40 is coupled to gas turbine engine 22 by rotational speed sensor 42 of system 20. Rotational speed sensor 42 generates signal "n" representative of the speed of turbine 28 or another rotating member of gas turbine engine 22. Fuel supply subsystem 30 includes fuel source 44 that selectively delivers fuel through actuatable valve 46 to gas turbine engine 22 via conduit 48 in the direction indicated by arrow F. Valve 46 is responsive to signals from overspeed control 40 to reduce or cut-off fuel flow to gas turbine engine 22. Typically, fuel supply subsystem 30 includes one or more fuel pumps, fuel meters, fuel regulators, and/or fuel modulators not shown to enhance clarity.

Figure 2:
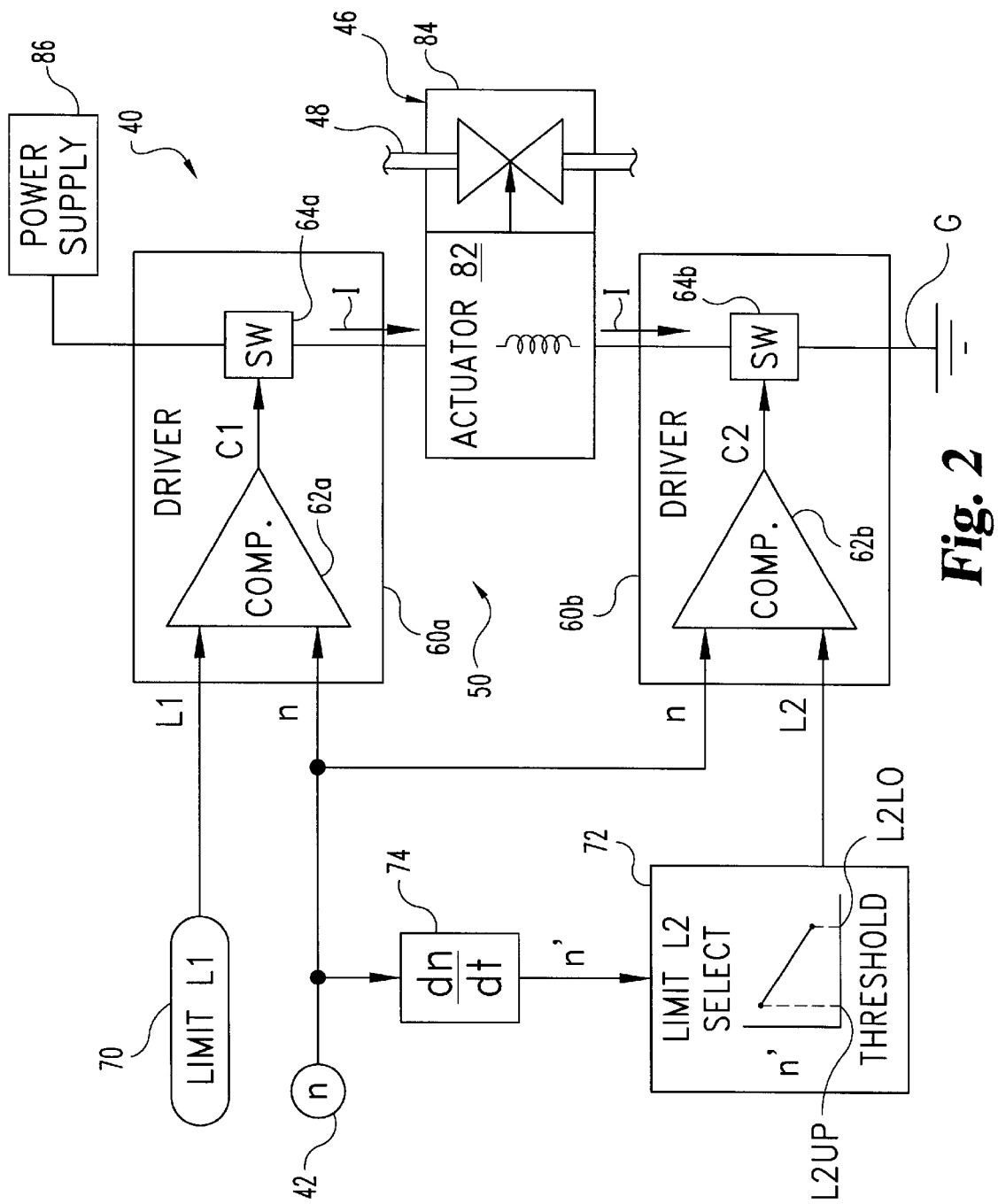
FIG. 2 is a control flow diagram of an overspeed control of the system shown in FIG. 1.

Referring additionally to FIG. 2, further details concerning overspeed control 40 and valve 46 are illustrated. Overspeed control 40 includes analog circuit 50. Analog circuit 50 includes drivers 60a, 60b. Drivers 60a, 60b each include a corresponding comparator (COMP.) 62a, 62b. Drivers 60a, 60b also each include a switch (SW) 64a, 64b coupled to an output of comparator 62a, 62b, respectively.

Comparators 62a, 62b are each responsive to at least two inputs. Comparator 62a compares the level of signal n from speed sensor 42 to a predetermined speed limit signal L1 as provided by limit generator 70. In one embodiment, signal L1 is provided as a voltage level with generator 70 being in the form of a constant or adjustable voltage input. In another embodiment, signal L1 may correspond to an analog current level with generator 70 configured accordingly. Typically, during operation of system 20, the level of signal L1 is generally maintained constant. However, it is envisioned that generator 70 may be configured to permit operator adjustments from time to time for calibration or other purposes. When rotational speed of a rotating member associated with gas turbine engine 22, as represented by input signal n to comparator 62a, exceeds a threshold level as represented by input signal L1 to comparator 62a, the output signal C1 of comparator 62a changes state to activate (close) switch 64a.

Comparator 62b compares the level of signal n to a different speed limit signal L2. Signal L2 is received by comparator 62b from variable limit generator 72. When rotational speed, as represented by input signal n to comparator 62b, exceeds a speed threshold as represented by input signal L2 to comparator 62b, output signal C2 of comparator 62b changes state to activate (close) switch 64b. Generator 72 provides L2 from a predefined range of potential values. This range has a lower extreme L2LO and an upper extreme L2UP (range L2LO:L2UP). The particular value of signal L2 output from range L2LO:L2UP is based on rate of change of rotational speed (rotational acceleration), as determined from signal n. This rate of change of rotational speed is represented by signal n'. Differentiator 74 provides signal n' from signal n.

Variable limit generator 72 may be provided in any of a number of forms. In one embodiment, generator 72 is provided by a circuit that outputs signal L2 as a linear voltage or current level between the extremes L2LO, L2UP, with L2 being directly proportional to n'. For this embodiment, if either extreme is reached, then generator 72 maintains the output at the corresponding extreme until n' changes to once again be within the variable range L2LO:L2UP. However, in other embodiments, the variation of signal L2 between extremes L2LO and L2UP may not be linear with respect to input signal n', instead, a different functional relationship including a discrete, polynomial, exponential, or logarithmic relationship may be additionally or alternatively used, just to name a few.

In one form, comparators 62a, 62b may be of the differential operational amplifier type and/or may be based on one or more arrangements of discrete components, transistor mirrors and the like. Also, comparators 62a, 62b may include a degree of hysteresis to reduce false triggering. Switches 62a, 62b may be in a form that includes a bipolar transistor and/or Field Effect Transistor (FET), an electromagnetic relay, solid state relay, optically activated switch, Silicon Controller Rectifier (SCR), triac, or such other type of switching device as would occur to those skilled in the art, including those of a mechanical, electromechanical, optical, solid-state, or other variety. While shown as discrete blocks, it is envisioned that differentiator 74 and/or generator 70, 72 may be part of one or more networks of passive and/or active components arranged to provide the desired operation.

As illustrated in FIG. 2, actuatable valve 46 includes actuator 82 and mechanical valve 84. Valve 84 changes position in response to activation of actuator 82. In one embodiment, actuator 82 is in the form of a solenoid that is activated by the flow of current through a corresponding electrical coil as schematically illustrated in FIG. 2. However, it should be recognized that other forms of actuators and/or actuatable valve arrangements are also contemplated as would occur to those skilled in the art.

In accordance with the configuration of circuit 50, Activation of actuator 82 requires sourcing electrical current I to actuator 82 from electrical power source 86 through switch 64a of driver 60a. Electrical current I is sunk to ground G from actuator 82 through switch 64b of driver 60b. For this arrangement, to activate actuator 82, both switches 64a, 64b are "closed" corresponding to active states of signals C1, C2 from comparators 62a, 62b. To provide this condition, signal n exceeds both speed limit signals L1 and L2.

Referring generally to FIGS. 1 and 2, one mode of operation of system 20 is next described. It should be appreciated that engine load loss failures usually correspond to a sustained increase in rotational speed and a large rotational acceleration. In contrast, overspeed excursions of the type that can be tolerated are generally brief and are not accompanied by significant acceleration relative to a load loss failure. Circuit 50 may be arranged to discriminate between speed/acceleration characteristic of an engine load loss and a tolerable overspeed excursion.

In one example, generator 70 sets signal L1 to correspond to a static overspeed level, and generator 72 sets L2LO less than or equal to L1 and L2UP greater than L1, such that: L2LO≦L1<L2UP. For this example, generator 72 is arranged so that the level assigned to signal L2 from range L2LO:L2UP decreases with increasing rotational acceleration, as represented by signal n'. When acceleration is nonexistent or at most below a low end acceleration threshold, then generator 72 sets signal L2 to the upper end of range L2LO:L2UP such that: L2=L2UP. On the other hand, as acceleration increases, the level assigned by generator 72 to signal L2 decreases until the low extreme L2LO of range L2LO:L2UP is reached, such that L2=L2LO. This lower extreme may correspond to signal n' exceeding an upper end acceleration threshold. As a result, the range between L1 and L2 for this example varies with L2.

Activation of valve 46 depends on switches 64a, 64b being concurrently closed, corresponding to a level of signal n that exceeds signals L1 and L2. For L2>1, overspeed excursions between L1 and L2 can occur without closing both switches 64a, 64b. At the lowest rotational acceleration extreme, activation of valve 46 does not occur unless the overspeed magnitude exceeds L2=L2UP. At the greatest rotational acceleration extreme, activation of valve 46 does not occur unless the overspeed magnitude exceeds L1 (L2= L2LO). Accordingly, for this embodiment, L2UP corresponds to a steady-state overspeed trip point and L2LO corresponds to an unacceptable transient overspeed trip point.

In another example, L1 and L2LO are approximately equal, such that: L1=L2LO<L2UP, with the level of L2 decreasing through range L2LO:L2UP as acceleration increases. In this instance, L1=L2LO provides the unacceptable transient overspeed trip point with L2UP still providing the steady-state overspeed trip point. Correspondingly, the dynamic range L1:L2 is greatest during steady-state operation and decreases to approximately zero with increasing acceleration. Engine overspeed can be expressed in terms relative to a rated speed, such as a nominal maximum design speed. Typically, overspeed beyond the maximum design speed is acceptable for brief periods of time. As a result, overspeed trip points may be set greater than 100% of the maximum design speed. In one instance, L1 and L2LO are set to 105% of the nominal maximum and L2UP is set to 125% of the nominal maximum. These values are believed to be particularly applicable to the Rolls Royce Allison Model No. 250-C40 gas turbine engine.

It should be understood that for other embodiments, relative levels may not be used and/or one or more overspeed trip points may not exceed 100% of the maximum speed rating. Also, in some alternative embodiments, measurements of n and/or n' may be subject to high frequency noise that could result in a very high, momentary acceleration reading, causing an undesirable lowering of the level for signal L2. For such embodiments, it may be desirable to include filtering to selectively detect and reduce the high frequency components of signals n' and/or n.

In other alternative embodiments, it should be recognized that overspeed control 40 may be defined in part or in whole by one or more controllers for system 20 that are directed to other operations, as well. For example, overspeed control 40 may be part of circuitry designed to modulate fuel flow to gas turbine engine 22 in response to a throttle and/or other inputs. Typically, fuel modulation is accomplished with a different valve than overspeed control valve 46; however, the same valve may be used in some applications. Additionally or alternatively, other embodiments of system 20 may partially or wholly define circuit 50 in terms of digital components, firmware, and/or software. For example, generator 72 may be provided in the form of a digital look-up table in the memory of a processor; differentiator 74 may be provided in the form of an approximating algorithm; and generator 70 may be provided as a digital value. Likewise, comparators 62a, 62b may be in a digital form suitable for interfacing with digital values for signals n, L1, and L2. In one particular application, one or more of these functions may be incorporated into a Full Authority Digital Engine Control (FADEC) for system 20.

In still other embodiments, redundant speed sensors may be utilized to assure overspeed detection in the event of the failure of one of the sensors, with overspeed control 40 correspondingly adjusted. In one such form, two speed sensors are used and the circuitry adapted, so that values of signals n and n' from either sensor will cause actuation of valve 46. Further, in yet other embodiments, sensors pertaining to the speed, and/or operation of load 32 may be incorporated into overspeed control 40 to further refine the determination as to when an overspeed condition should be recognized and addressed.

All publications, patent, and patent applications cited in this specification are herein incorporated by reference as if each individual publication, patent, or patent application were specifically and individually indicated to be incorporated by reference and set forth in its entirety herein. Any theory of operation or finding described herein is merely intended to enhance understanding of the present invention and should not be construed to limit the scope of the present invention as defined by the claims that follow to any stated theory or finding. While the invention has been illustrated and described in detail in the drawings and foregoing description, the same is to be considered as illustrative and not restrictive in character, it being understood that only the preferred embodiment has been shown and described and that all changes, modifications, and equivalents that come within the spirit of the invention as defined by the following claims are desired to be protected.

What is claimed is:

1. A method, comprising:
    sensing rotational speed of a rotating member of a gas turbine engine;
    providing a first speed threshold that varies with rotational acceleration of the rotating member over a range; and
    detecting an overspeed condition of the gas turbine engine if the rotational speed exceeds the first speed threshold and a second speed threshold, the second speed threshold being greater than or equal to the first speed threshold when the overspeed condition is detected.

2. The method of claim 1, further comprising actuating a fuel valve in response to said detecting.

3. The method of claim 1, wherein the second speed threshold is fixed and the first speed threshold decreases as the rotational acceleration increases.

4. The method of claim 1, wherein said detecting includes activating an electromagnetic acuator for a fuel valve with a first drive circuit and a second drive circuit, one of the first and second drive circuits sourcing electric current to the actuator and another of the first and second drive circuits sinking current from the actuator.

5. The method of claim 4, wherein the first drive circuit includes a first comparator to compare the rotational speed and the first speed threshold and the second drive circuit includes a second comparator to compare the rotational speed and the second speed threshold.

6. The method of claim 1, wherein the second speed threshold is greater than a lower extreme of the range for the first speed threshold.

7. A method, comprising:
    determining rotational speed of a rotating member of a gas turbine engine; and
    establishing an overspeed condition of the gas turbine engine if the rotational speed exceeds a first speed threshold and a second speed threshold, the first speed threshold varying relative to the second speed threshold in accordance with rate of change of the rotational speed.

8. The method of claim 7, further comprising actuating a fuel valve in response to the overspeed condition.

9. The method of claim 7, further comprising activating an electromagnetic acuator for a fuel valve with a first drive circuit and a second drive circuit in response to the overspeed condition, one of the first and second drive circuits sourcing electric current to the actuator and another of the first and second drive circuits sinking current from the actuator.

10. The method of claim 9, wherein the first drive circuit includes a first comparator to compare the rotational speed and the first speed threshold and the second drive circuit includes a second comparator to compare the rotational speed and the second speed threshold.

11. The method of claim 7, further comprising selecting the second speed threshold based on unexpected loss of engine load and the first speed threshold based on expected engine transient performance.

12. The method of claim 11, wherein the second speed threshold is fixed, wherein the first speed threshold decreases with increasing rotational acceleration of the rotating member.

13. An apparatus, comprising:

a gas turbine engine with a rotatable member;

a sensor to provide a first signal corresponding to rotational speed of said rotatable member;

a control responsive to said first signal to detect an overspeed condition of said gas turbine engine if the rotational speed exceeds a first speed threshold and a second speed threshold, said control being operable to determine the first speed threshold as a function of rotational acceleration of the rotatable member, the first speed threshold varying relative to the second speed threshold in accordance with the rotational acceleration; and an actuator responsive to said control to reduce the rotational speed when the overspeed condition is detected.

14. The apparatus of claim 13, further comprising a fuel valve responsive to activation of said actuator.

15. The apparatus of claim 13, wherein said control includes an analog circuit comprising:

a first comparator operable to generate a second signal if the rotational speed exceeds the first speed threshold; and a second comparator operable to generate a third signal if the rotational speed exceeds the second speed threshold.

16. The apparatus of claim 15, wherein said analog circuit is operable to provide electric power to said actuator in response said second and third signals, one of said second and third signals being operable to source electric current to said actuator and another of said second and third signals being operable to sink the electric current from said actuator when the rotational speed exceeds the first and second speed thresholds.

17. The apparatus of claim 13, wherein said control includes a first drive circuit and a second drive circuit, one of said first and second drive circuits sourcing electric current to said actuator and another of said first and second drive circuits sinking the electric current from said actuator when rotational speed exceeds the first and second speed thresholds.

18. The apparatus of claim 17, wherein said first drive circuit includes a first comparator responsive to the rotational speed and the first speed threshold to generate a first drive signal when the rotational speed exceeds the first threshold and said second drive circuit includes a second comparator responsive to the rotational speed and the second speed threshold to generate a second drive signal when the rotational speed exceeds the second threshold, the electric current being provided to said actuator when said first and second drive signals are contemporaneously generated.

19. The apparatus of claim 18, further comprising a differentiation circuit to determine the rotational acceleration from the rotational speed.

20. The apparatus of claim 19, further comprising a selection circuit to determine said first speed threshold based on the acceleration.

21. The apparatus of claim 13, wherein said control includes means for comparing the rotational speed to the first and second speed thresholds, means for driving said actuator, means for determining the rotational acceleration from the rotational speed, and means for selecting the first speed threshold from a predetermined range based on the rotational acceleration.

* * * * *